US007899692B2

(12) United States Patent
Caballero et al.

(10) Patent No.: US 7,899,692 B2
(45) Date of Patent: Mar. 1, 2011

(54) TRAVEL SERVICE AGGREGATOR

(75) Inventors: Gerardino Canciller Caballero, Coto de Caza, CA (US); David P. Evans, Salt Lake City, UT (US); Terry Wayne Hornbaker, Salt Lake City, UT (US); Martin J. Drefs, Edina, MN (US); Jefferson Bridger Walsh, Sandy, UT (US)

(73) Assignee: Accenture Global Services Limited, Dublin (IE)

( * ) Notice: Subject to any disclaimer, the term of this patent is extended or adjusted under 35 U.S.C. 154(b) by 213 days.

(21) Appl. No.: 12/042,973

(22) Filed: Mar. 5, 2008

(65) Prior Publication Data

US 2008/0294469 A1    Nov. 27, 2008

Related U.S. Application Data

(60) Provisional application No. 60/893,056, filed on Mar. 5, 2007.

(51) Int. Cl.
*G06Q 10/00* (2006.01)
*G01C 21/34* (2006.01)

(52) U.S. Cl. .................... 705/5; 705/6; 705/1.1
(58) Field of Classification Search .......... 705/1.1, 705/5–6
See application file for complete search history.

(56) References Cited

U.S. PATENT DOCUMENTS

| 5,253,165 | A  | * | 10/1993 | Leiseca et al. | 705/5 |
| 6,854,010 | B1 | * | 2/2005 | Christian et al. | 709/223 |
| 2001/0053989 | A1 | * | 12/2001 | Keller et al. | 705/5 |
| 2002/0077871 | A1 | * | 6/2002 | Udelhoven et al. | 705/5 |
| 2003/0097274 | A1 | * | 5/2003 | Parsons | 705/1 |
| 2003/0110063 | A1 | * | 6/2003 | Among et al. | 705/6 |

(Continued)

FOREIGN PATENT DOCUMENTS

EP    1096405 A2  *  5/2001

(Continued)

OTHER PUBLICATIONS

International Preliminary Report on Patentability for Application No. PCT/US2008/055959, dated Sep. 17, 2009, 8 pages.

(Continued)

*Primary Examiner*—Fadey S Jabr
(74) *Attorney, Agent, or Firm*—Fish & Richardson P.C.

(57) ABSTRACT

The subject matter of this specification can be embodied in, among other things, a system that includes a user interface to receive an electronic status change for an airline flight and an airline reservation system to determine whether at least one ancillary travel service associated with the airline flight should be modified based on the received electronic status change. The system includes a messaging interface to electronically transmit a request to modify the at least one ancillary travel service based on the electronic status change if the determination is made to modify the at least one ancillary travel service. The messaging interface further electronically transmits payment information to the travel service provider for use in crediting or debiting a payment associated with the at least one modified ancillary travel service. The payment information is associated with a customer that reserved the at least one ancillary travel service.

17 Claims, 4 Drawing Sheets

U.S. PATENT DOCUMENTS

| | | | |
|---|---|---|---|
| 2003/0225600 A1* | 12/2003 | Slivka et al. | 705/5 |
| 2004/0039613 A1* | 2/2004 | Maycotte et al. | 705/5 |
| 2004/0039617 A1* | 2/2004 | Maycotte et al. | 705/5 |
| 2005/0096946 A1* | 5/2005 | Janakiraman et al. | 705/5 |
| 2005/0192851 A1* | 9/2005 | Rangnekar | 705/5 |
| 2005/0288973 A1 | 12/2005 | Taylor et al. | |
| 2006/0155591 A1* | 7/2006 | Altaf et al. | 705/5 |
| 2006/0265256 A1* | 11/2006 | Galperin et al. | 705/5 |
| 2007/0219832 A1* | 9/2007 | Willacy | 705/5 |
| 2008/0004917 A1* | 1/2008 | Mortimore | 705/5 |
| 2008/0027768 A1* | 1/2008 | Thurlow et al. | 705/6 |
| 2008/0270222 A1* | 10/2008 | Goel | 705/10 |
| 2008/0319808 A1* | 12/2008 | Wofford et al. | 705/6 |
| 2009/0271226 A1* | 10/2009 | De Marcken | 705/5 |

FOREIGN PATENT DOCUMENTS

| | | |
|---|---|---|
| KR | 1020010000527 | 1/2001 |
| KR | 10-2003-0016277 | 2/2003 |
| WO | WO 9732266 A1 * | 9/1997 |

OTHER PUBLICATIONS iBiz Framework, *An unmatched set of features*, downloaded from http://www.ibizframework.com/CommerceEditionOverview,aspx on Aug. 19, 2008, 1 page.

iBiz Framework, *True Enterprise class architecture*, downloaded from http://ibizframework.com/CommerceEditionArchitecture.aspx on Aug. 19, 2008, 1 page.

iBiz Framework, *Think outside the box*, downloaded from http://ibizframework.com/CommerceEditionFeatures.aspx on Aug. 19, 2008, 2 pages.

iBiz Framework, *Delivering where others have not*, downloaded from http://ibizframework.com/CommerceEditionComparison.aspx on Aug. 19, 2008, 1 page.

iBizFramework, *Success Story*, downloaded from http://ibizframework.com/Conten/IBIZ/Other/Bachrach.pdf on Aug. 19, 2008, 4 pages.

* cited by examiner

TRAVEL SERVICE AGGREGATOR

CROSS-REFERENCE TO RELATED APPLICATIONS

This application claims priority to U.S. Application Ser. No. 60/893,056, filed on Mar. 5, 2007, and entitled "Travel Service Aggregator," the contents of which are hereby incorporated in their entirety by reference.

TECHNICAL FIELD

This instant specification relates to managing requested travel services.

BACKGROUND

Some airline reservation systems have web interfaces (or web services) that permit a travelers or travel agencies to request seats for travel on airline flights. In building an itinerary for a trip, travelers or travel agencies can also request reservations from several other travel provider systems such as car rental agencies and hotels. However, in certain circumstances, airline flights may be rescheduled or cancelled, which can be very inconvenient for travelers not only because the flight was changed but also because other travel services are affected by the changed flight. (e.g., the other travel services are unnecessary because a traveler's flight was cancelled).

SUMMARY

In general, this document describes rescheduling or cancelling travel service ancillary to a rescheduled or cancelled airline flight (or other travel conveyance).

In a first general aspect, a system is described that includes a user interface to receive an electronic status change for an airline flight and an airline reservation system to determine whether at least one ancillary travel service associated with the airline flight should be modified based on the received electronic status change.

The system includes a messaging interface to electronically transmit a request to modify the at least one ancillary travel service based on the electronic status change if the determination is made to modify the at least one ancillary travel service. The messaging interface further electronically transmits payment information to the travel service provider for use in crediting or debiting a payment associated with the at least one modified ancillary travel service. The payment information is associated with a customer that reserved the at least one ancillary travel service.

In a second general aspect, a computer-implemented process for managing travel services is described. The process includes receiving at a travel reservation system an electronic status change for a travel conveyance and electronically accessing a digital travel record stored in the travel reservation system. The digital travel record includes a reservation for at least one ancillary travel service associated with the travel conveyance.

The process also includes determining whether the at least one ancillary travel service should be modified based on the electronic status change for the travel conveyance and electronically transmitting, from the travel reservation system to a remote travel service provider associated with the at least one ancillary travel service, a request to modify the at least one ancillary travel service based on the electronic status change if the determination is made to modify the at least one ancillary travel service.

The process includes electronically transmitting payment information from the travel reservation system to the travel service provider for use in crediting or debiting a payment associated with the at least one modified ancillary travel service. The payment information is associated with a customer that reserved the at least one ancillary travel service.

The systems and techniques described here may provide one or more of the following advantages. First, a system can provide a implied payment system for an airline reservation system, where payment information is passed to ancillary travel providers for processing. Second, rescheduling travel itineraries can be simplified by automatically rescheduling ancillary travel services if an airline flight is cancelled or rescheduled. Third, the convenience of initially scheduling a travel itinerary can be increased by permitting an airline reservation system to manage the reservation of additional travel services as well.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
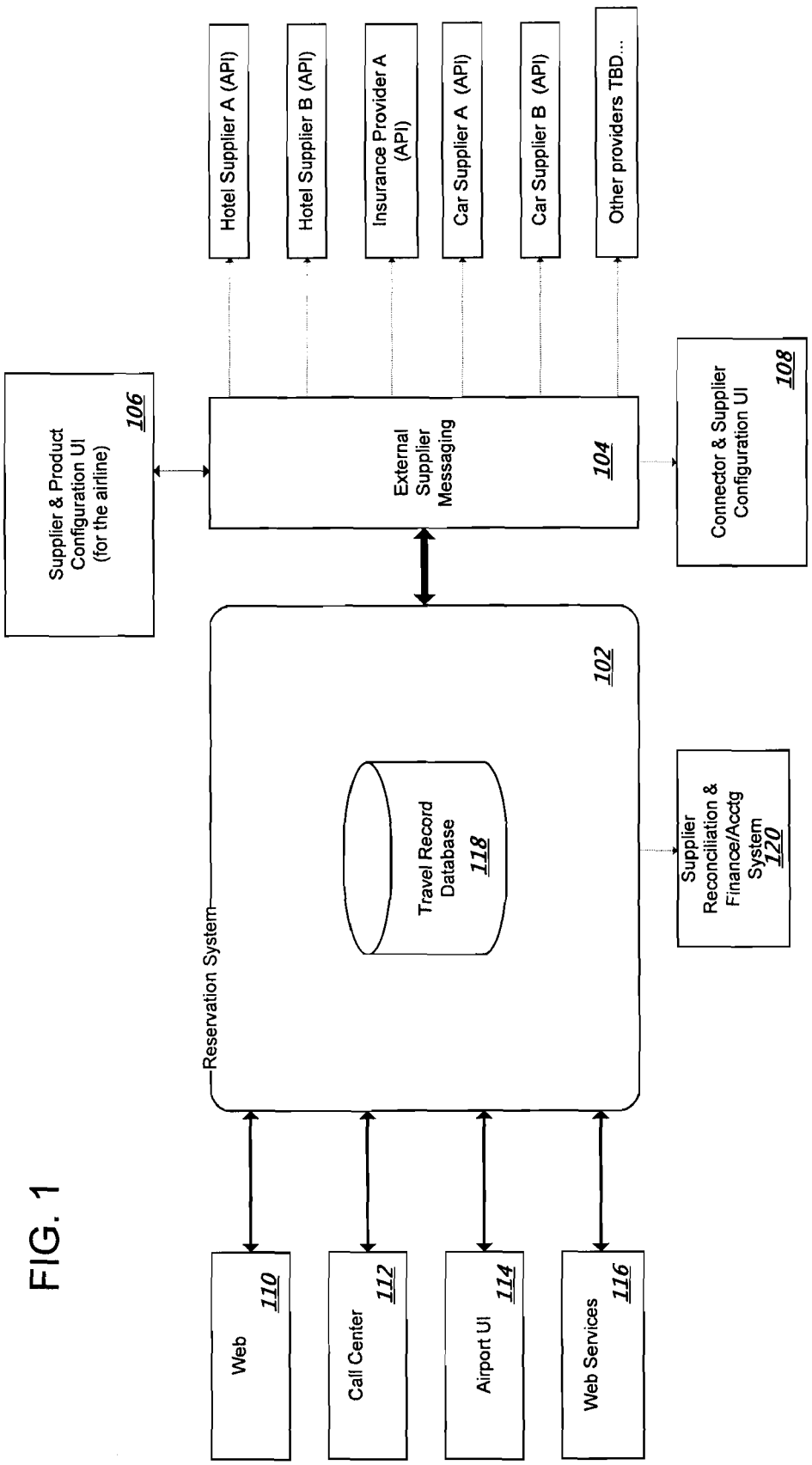
FIG. 1 shows a block diagram of an exemplary system for managing airline reservations and additional travel services.

FIG. 1 shows a block diagram of a system 100 for managing airline reservations and additional travel services. The system 100 and includes an airline reservation module 102 that uses a messaging interface 104 to communicate with third parties that provide additional travel services, such as car rentals, hotel reservations, cruise reservations, travel insurance, etc.

In certain implementations, a customer (which may be a traveler, or an intermediary for the traveler, such as a travel agent) can reserve or purchase a variety of travel services by accessing an airline reservation system, which in turn communicates with third parties that offer additional services (e.g., hotel rentals, car rentals, travel insurance, etc.). The system 100 can retrieve pricing and availability information from the third parties and transmit reservation and purchase requests for the additional travel services.

Additionally, in certain implementations, changes in the status of a traveler's flight can trigger communications with third-party travel service providers. If a traveler's flight is canceled the reservation module 102 initiates communication with a third party to cancel or modify other travel services that are dependent upon the traveler's flight. For example, if a traveler's flight to Honolulu is cancelled due to bad weather, the reservation module 102 can initiate a cancellation request for the traveler's hotel reservations in Honolulu.

In the implementation show in FIG. 1, the reservation module 102 communicates with the third parties using the messaging interface 104 to access the third parties' systems through public application program interfaces (APIs) over a network, such as the Internet. The messaging interface 104 can translate requests, such as reservation or cancellation requests, into messages that are understood by the third parties' systems.

For example, if the reservation module 102 requests a cancellation of a car rental from Hertz, the messaging interface 104 uses a Hertz API to translate the request from a format used by the reservation module 102 to a format compatible with Hertz's system. So if the command used by the reservation module 102 for cancelling a car rental from Hertz is "HertzCarCancel (date, reservationNum)," the messaging interface 104 can translate the command into "CR (reservationNum)," which may be a command specified by the Hertz API that is used to cancel car rentals.

In some implementations, each third party may have a different API used for communication. The messaging interface 104 can translate commands, or messages, passed from each of the third parties into a format compatible with the reservation module 102 and vis-a-versa.

The messaging interface 104 can be accessed using user interfaces (UIs), such as the Supplier & Product Configuration UI 106 or the Connector & Supplier Configuration UI 108. The Supplier & Product Configuration UI 106 can be used to set constraints on communication with the third parties. In certain implementations, agents for the airline can filter which third parties may offer travel services. For example, the messaging interface may provide support for communicating with Hertz, Avis, and Budget Car rental companies, however, the airline may have contractual obligations that favor Hertz and Avis. Agents for the airline can specify using the Supplier & Product Configuration UI 106 that only services from Hertz and Avis are offered.

In other implementations, the Supplier & Product Configuration UI 106 can be used to specify rules that determine which third parties are permitted to offer services to travelers under specified conditions. For example, the messaging interface 104 may only transmit product or service information and/or availability information to the reservation module if prices are below a threshold set by the airline. In one particular example, the threshold can be set so that travel insurance quotes that exceed 5% of the cost of the currently purchased travel services are not transmitted to the reservation module.

As mentioned above, the messaging interface 104 can also be configured using the Connector & Supplier Configuration UI 108. In certain implementations, the Connector & Supplier Configuration UI 108 permits users to configure, add, or remove third party APIs. For example, the user can add support for Princess Cruise Line cruises using the UI to specify the necessary format, or API, used by Princess Cruise Line to receive reservation requests, price queries, cancellation requests, etc. In another example, an existing third party travel service provider may change the API used to commutate with its system. A user can use the Connector & Supplier Configuration UI 108 to modify the existing third party API stored in the messaging interface 104 to reflect the changes implemented by the third party.

Travelers and other users of the reservation module 102 can interface with it in several ways including using a web browsing interface 110, a call center interface 112, an airport UI 114, and a web service interface.

In some implementations, the web browsing interface 110 permits travelers to access the reservation module 102. For example, a traveler can request a reservation for an airline flight by accessing the airline's webpage, which serves as an interface to the reservation module 102. In addition to reserving a flight from the airline, the travel may be presented with other travel services for purchase. For example, if the traveler requests a flight to San Francisco, the reservation module may transmit a request to the messaging interface 104, which queries the third parties for complimentary travel services. The messaging interface 104 may receive price quotes from Hertz and Avis car rental companies for car rentals available at the San Francisco International Airport on the date of the reserved flight. These quotes can then be presented to the traveler.

In other implementations, an intermediary may access the web browsing interface on behalf of the traveler. For example, a travel agent can use the web browsing interface 110 to request reservations and additional travel services for the traveler.

The call center interface 112 can, in certain implementations, permit a call center system (not shown) to interface with the reservation system. Travelers may contact the call center to make travel reservations, and agents at the call center can access the reservation module 102 for reservations and additional travel services.

In some implementations, the airport UI 114 can permit employees of the airport to access the reservation module 102. For example, gate agents can use client computing devices to access the reservation module 102 to check the status of flights, change reservations, input changes for flight status, etc.

The web services interface 116 can, in certain implementations, be an API that allows a variety of systems to communicate with the reservation system. For example, the API may support RSS feeds that are transmitted to a traveler to update the traveler on the status of flights and other travel services associated with the traveler.

In certain implementations, the reservation module 102 stores travel information associated with each traveler in a travel record database 118. For example, a traveler's flights, car rentals, travel insurance, and hotel reservations can be recorded in a single travel record associated with the traveler and stored in the database 118.

The reservation module can also include interfaces to communicate with other systems, such as the Supplier Reconciliation & Finance/Accounting system 120. This system can access the reservation module 104 and the travel records to track travel purchases for accounting purposes, such as tracking services purchased from third parties to ensure the third parties receive the appropriate compensation.

Figure 2:
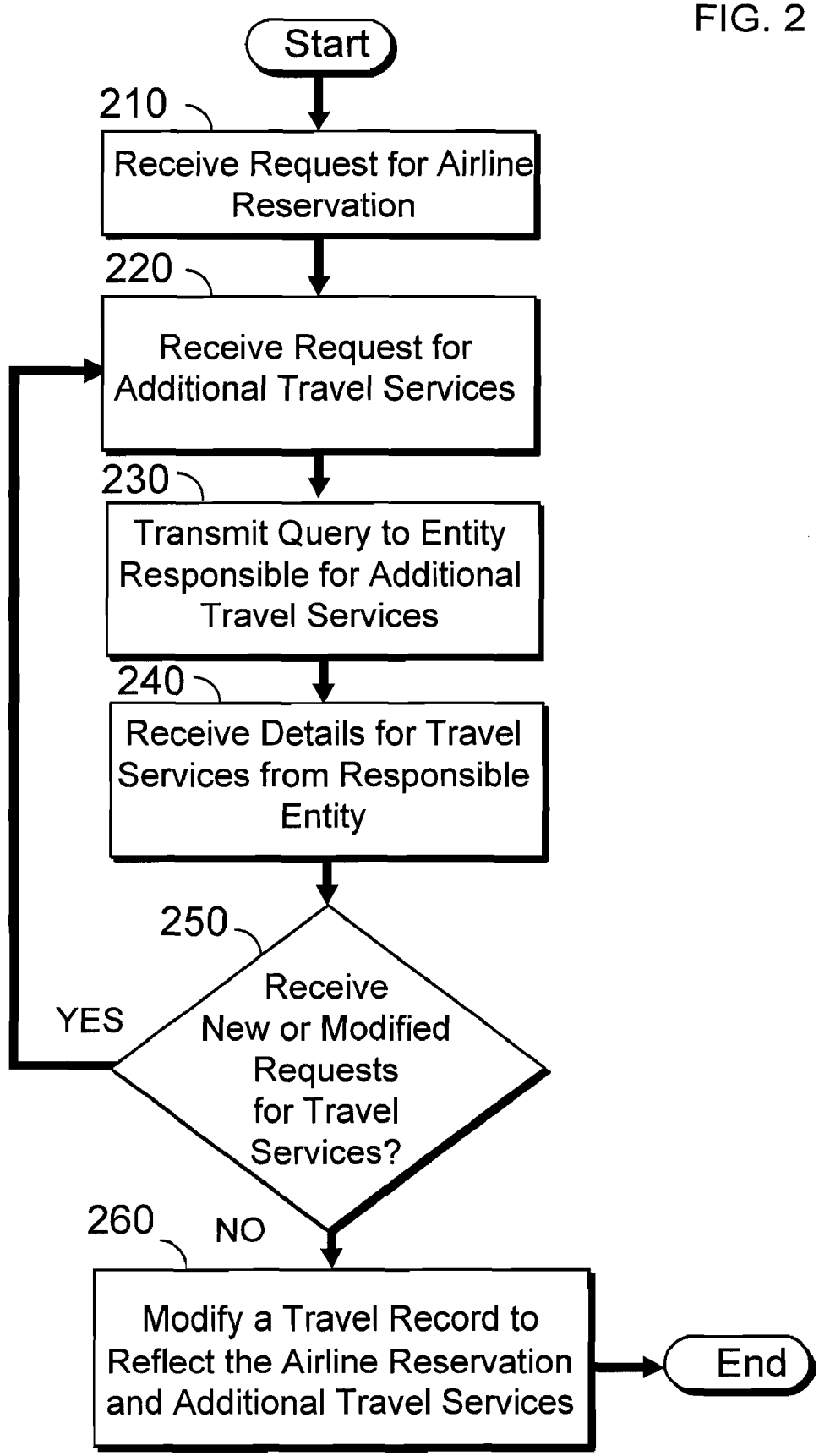
FIG. 2 is a flow chart of an exemplary method for requesting travel services.

FIG. 2 is a flow chart of an exemplary method 200 for requesting travel services. In some implementations, the method 200 can be executed by one or more computing devices hosting a reservation module, such as the reservation module 102 of FIG. 1.

In step 210, a request for an airline reservation is received. For example, a traveler may logon to an airline's webpage using the web browsing interface and request a flight reservation from the airline. The web browsing interface can transmit the request to the reservation module.

In step 220, requests for additional travel services can be received. For example, the airline's web page may display a screen asking the traveler if she wishes to book additional travel services, such as a hotel or car rental reservation in addition to the flight reservation. The traveler may then select the additional travel services in which she is interested and transmit this information to the reservation module.

In step 230, a query is transmitted to the entity responsible for the requested additional travel services. For example, if the traveler responds that she is interested in a hotel reservation, the reservation module can query a third party hotel system using an appropriate API.

In step 240, details are received from the entity responsible for the requested travel services. For example, the hotel system can respond to the query transmitted by the reservation module with information including reservation availability for hotel rooms and pricing.

In step 250, a determination is made whether new or modified requests for travel services are received. For example, the traveler may request additional travel services, such as a car rental or may request additional quotes from different hotels. If additional requests are received, the method 200 moves back to step 220, otherwise, step 260 can be performed.

In step 260, a travel record is modified to reflect the airline reservation and additional travel services. For example, a travel record associated with the traveler requesting the services can be created or modified. The services requested by the traveler can be included in the record along with information associated with the services, such as pricing, date, provider, travel restrictions, payment information, etc. After step 260, the method 200 can end.

Figure 3:
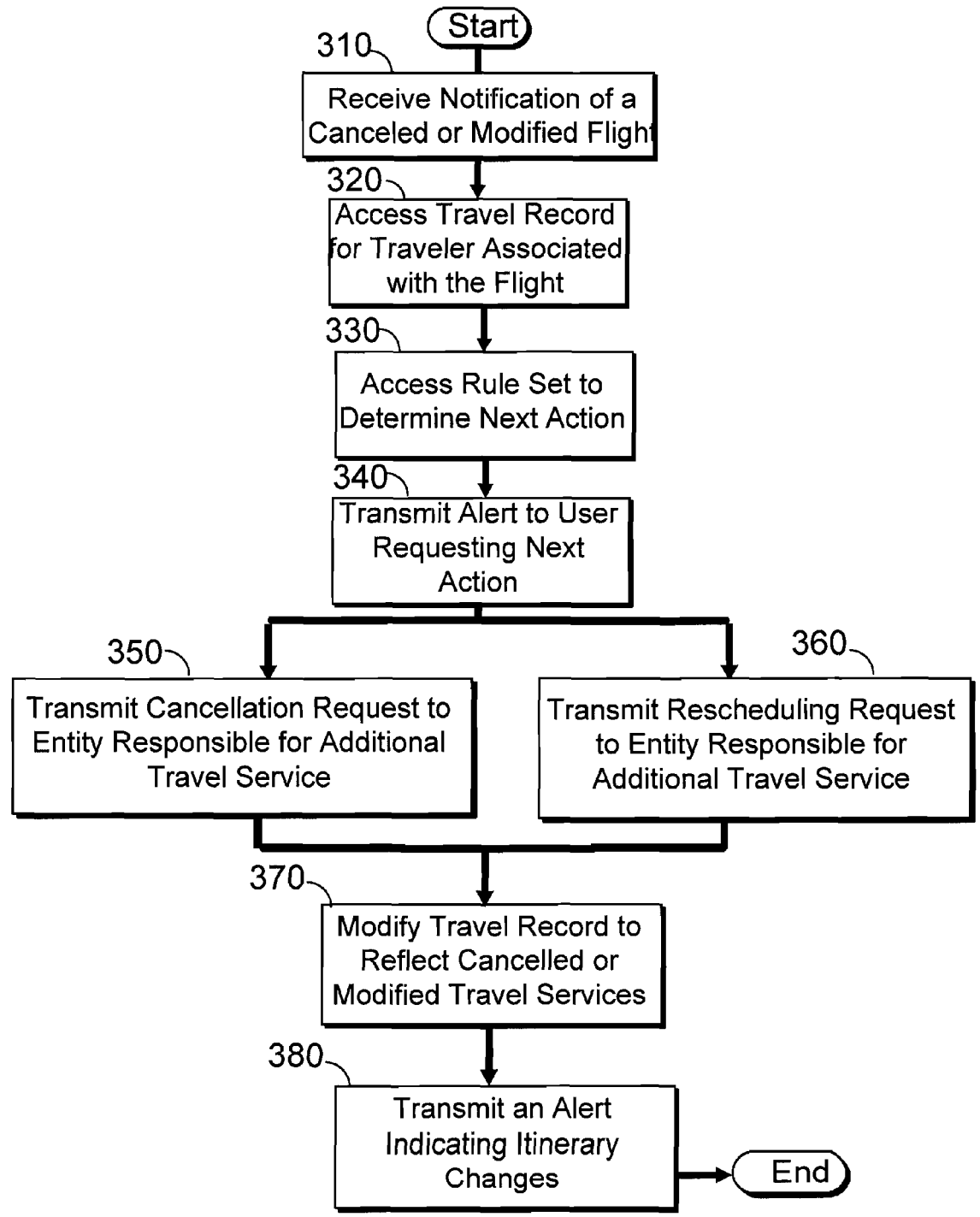
FIG. 3 is a flow chart of an exemplary method for modifying travel services.

FIG. 3 is a flow chart of an exemplary method 300 for modifying travel services. In certain implementations, the method 300 is executed by one or more computing devices that host the reservation module 102.

In step 310, a notification of a flight cancellation or modification is received. For example, an airline employee can use the airport UI 114 to enter information into the reservation module 102 that a flight is cancelled or delayed (or reservation module 102 can receive this flight cancellation or modification information from another system). In step 320, a travel record for a traveler associated with the flight is accessed. For example, the reservation module 102 can access the travel record database 118, which may store travel records.

In one implementation, travel records can be indexed, for example, based on flight information. When the reservation module receives information that a flight has a change in status (e.g., delayed, cancelled, etc.), the reservation module can query the database for records associated with the flight. After locating a travel record associated with the flight, the method 300 can execute step 330.

In optional step 330, a rule set can be accessed to determine a next action. The actions can include cancelling all or a subset of related travel services or rescheduling all or a portion of the travel services based on the modified flight status. For example, if a flight is delayed by an hour, one rule of the rule set can specify that the associated travel services listed in a travel record should not be cancelled or rescheduled. If, on the other hand, a flight is delayed by four hours, the rule can determine that a car rental should be rescheduled for four hours later, but a hotel reservation should remain unchanged.

In optional step 340, an alert requesting a next action can be transmitted to a user. For example, instead of accessing the rule set, an alert can be transmitted to the user when a flight is cancelled or delayed. The user can then determine whether to reschedule, change, or cancel any associated travel services. In some implementations, the rule set described in step 330 may generate an initial next action. An alert is sent to the user who reviews the initial next action and can approve, modified, or deny the next action determined by the rule set.

In steps 350 and 360, cancellation and rescheduling requests can be transmitted to the third parties responsible for the additional travel services, respectively. Which step is performed may be dependent upon the next action previously determined. For example, if the rule set (or user) previously determined that a hotel reservation should be cancelled, step 350 can be performed. If the rule set determined that the hotel reservation should be rescheduled, step 360 can be performed.

In certain implementations, the reservation module can transmit the requests to the third party travel service providers using the messaging interface and the APIs for the service providers. For example, if a travel record associated with a cancelled flight has a hotel reservation at the San Francisco Hilton, the reservation module can use the messaging interface to transmit a cancellation request to the Hilton's system using the Hilton API.

Sending rescheduling requests may be accomplished in a similar manner. However, in some circumstances, the reserved service may not be available at the new desired time. In certain implementations, a cancellation request can be transmitted if the travel service is not available at the new time and a request for the same service can be transmitted to a new travel service provider. For example, if a luxury car rental from Hertz is not available at the delayed time, the system can request the Hertz reservation be cancelled and can request a luxury car rental from another car provider, such as Avis.

In some implementations, the request for a substitute travel provider can specify that certain constraints, such as rental cost, car-size, travel service provider (e.g., only certain companies are desired by a traveler or other user), payment type (e.g., takes American Express credit cards), etc., be met. For example, the system may specify that the price for renting the new luxury car be at or below the price for the Hertz luxury car rental. The system may query several travel service providers and reschedule if the constraints are met.

In step 370, the travel record can be modified to reflect the cancelled or rescheduled additional travel services, and in step 380, a modified travel itinerary can be transmitted to a user. For example, the reservation module can transmit the modified itinerary to the traveler using contact information, such as an email address, stored in the travel record. In another example, the information can be transmitted to a travel agent, such as a travel agent that requested the services. After optionally transmitting the modified itinerary, the method 300 can end.

Figure 4:
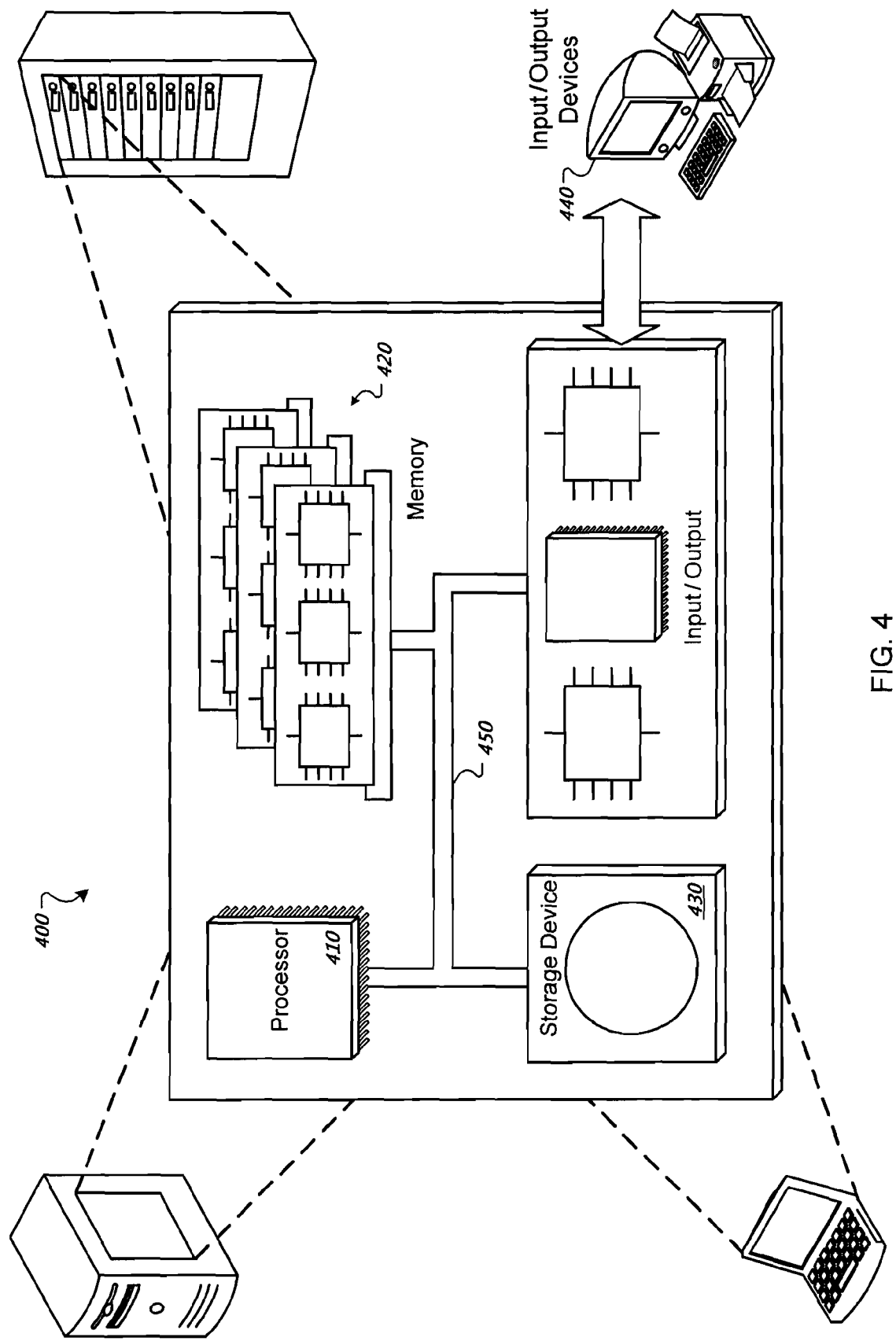
FIG. 4 is a schematic of an exemplary computer system.

FIG. 4 is a schematic diagram of a computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In certain implementations, the reservation module 102 can manage a variety of reservation types. For example, the reservation module can manage car rental, hotel, rail (e.g., train), or cruise reservations instead of airline reservations.

In yet other implementations, the reservation module manages several types of travel services. For example, the reservation module can manage car rental, hotel, and airline reservations. In some implementations, the system may still have a messaging interface to communicate with service providers for travel service it does not manage, such as travel insurers.

In some implementations, payments associated with ancillary travel services can be adjusted based on changes to an airline flight's schedule. For example, if an airline flight is cancelled, the airline reservation system can refund a customer's payment for that flight. Additionally, the airline reservation system can transmit payment information to travel providers associated with reserved travel services that are ancillary to the cancelled flight. The travel providers can cancel the ancillary travel services and refund any money previously debited for the services.

In some implementations, the payment information passed to the travel providers can include credit card information. The airline reservation system may receive the credit card information during reservation of a seat on an airline flight (and/or during reservation of travel services that are ancillary to the airline flight such as hotel reservations, travel insurance, car rentals, cruise reservations, event or activity reservations, etc.).

The airline reservation system may, in some implementations, transmit the credit card information to the travel service providers if an ancillary travel service is cancelled or rescheduled. In a case where one or more ancillary travel services are cancelled because an airline flight is cancelled or rescheduled, each of the travel providers responsible for the ancillary travel services can refund any money previously charged for the ancillary travel services by charging the payments back to the credit card. This may reduce the complexity of a payment system at the reservation system by having the responsible travel providers manage financial issues associated with travel services they provide instead of having the reservation system manage payments for all travel services related to a travel itinerary (even if a customer used the reservation system to request all travel services for a travel itinerary).

In another example, if the purchased ancillary travel service is travel insurance, the airline reservation system can forward payment information to a responsible travel insurer for collecting a claim payment. For example, the reservation system can forward bank account information to the travel insurer, which can credit the account with a payment for the insured amount.

In some implementations where an airline flight is rescheduled, payment information passed to the travel providers can be used to refund a partial amount instead of a full amount for ancillary travel services that are rescheduled instead of cancelled. For example, if a flight is rescheduled, hotel reservations may also have to be rescheduled so that they coincide with the new flight. If the newly rescheduled hotel reservations are at a cheaper rate, the difference can be credited by the appropriate travel provider to an account indicated in the payment information.

In another implementation, the original travel provider may not be able to fulfill the rescheduled travel service. In this case, the original travel provider can cancel the service, refund any charges, and the reservation system can request that another travel provider fulfill the request for the rescheduled travel service. The new travel provider can then use the payment information to charge the customer for the reserved travel service.

On the other hand, if the rescheduled travel service is more expensive, the payment information passed to the travel provider can be used to debit the extra amount for the rescheduled travel service. In some implementations, the customer can specify an extra amount the customer is willing to pay if his or her travel itinerary requires rescheduling. The airline reservation system can use this specified threshold to determine whether to pass payment information to the travel providers for debiting purposes.

For example, at the time of reservation, the customer may specify that he or she is willing to pay an extra $100 for rescheduled hotel reservations and an extra $25 for rescheduled car reservations. If a flight is rescheduled, the airline reservation system can query the hotel and car agency systems responsible for providing the hotel and car reservations. If the hotel and car agency systems respond with quotes indicating that the cost of the rescheduled travel services will not exceed the $100 or $25 thresholds, then the airline reservation system can transmit the payment information and can request that the hotel and car agency systems reschedule the travel services and charge the extra amount.

In another implementation, the airline reservation system can initiate an authorization request to a customer inquiring whether the customer approves an extra amount required to reschedule any ancillary travel services. For example, if rescheduled ancillary travel services cost more, the airline reservation system can transmit an email to the customer listing the increased amount and requesting authorization to reschedule the services. The email may include HTML that displays an accept button that when clicked initiates a response that authorizes the airline reservation system to pass payment information to the travel providers for debiting the extra amounted quoted for rescheduling the travel services.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer storage medium encoded with a computer program for managing travel services, the program comprising instructions that when executed by one or more computers cause the one or more computers to perform operations comprising:
   receiving at a travel reservation system an electronic status change for a travel conveyance;
   electronically accessing a digital travel record stored in the travel reservation system, the digital travel record comprising a reservation associated with a traveler for at least one ancillary travel service associated with the travel conveyance;
   determining that a rule indicates that the at least one ancillary travel service should automatically be modified based on the electronic status change for the travel conveyance;
   generating an initial next action that the rule specifies is to automatically occur with respect to the at least one ancillary travel service, based on determining that the rule indicates that the at least one ancillary travel service should automatically be modified;
   electronically transmitting an alert from the travel reservation system to the traveler, the alert identifying, and inviting the traveler to, through interaction with the alert, approve, modify, or deny, the initial next action that the rule specifies is to automatically occur with respect to the at least one ancillary travel service;
   receiving an approval indication indicating that the traveler approves of the initial next action;
   electronically transmitting, from the travel reservation system to a remote travel service provider associated with the at least one ancillary travel service, a request to modify the at least one ancillary travel service based on the approval indication, the request identifying a current cost associated with the at least one ancillary travel service, and a threshold, set by a company providing the travel conveyance, that specifies a maximum extent to which a cost associated with the modified ancillary travel service may vary from the current cost;
   receiving, by the travel reservation system from the remote travel service provider, an indication that the remote travel service provider can provide the modified ancillary travel service while satisfying the threshold; and
   electronically transmitting payment information from the travel reservation system to the travel service provider for use in crediting or debiting a payment associated with the at least one modified ancillary travel service, wherein the payment information is associated with a customer that reserved the at least one ancillary travel service.

2. The computer storage medium of claim 1, wherein the travel conveyance comprises a train, a cruise ship, or a rental vehicle.

3. The computer storage medium of claim 1, wherein the operations further comprise:
   selecting a substitute travel service provider from at least one alternate travel service provider for the at least one ancillary travel service, the at least one alternate travel service provider including one or more contractually favored travel service providers that a company providing the travel conveyance has a contractual obligation to favor; and
   generating the alert, wherein the initial next action relates to the substitute travel service provider.

4. The computer storage medium of claim 3, wherein the at least one alternate travel service provider further includes one or more traveler preferred service providers that the traveler has indicated a preference towards.

5. The computer storage medium of claim 3, wherein the at least one alternate travel service provider only includes contractually favored travel service providers.

6. The computer storage medium of claim 1, wherein the at least one alternate travel service provider further includes one or more traveler preferred service providers that the traveler has indicated a preference towards.

7. The computer storage medium of claim 1, wherein the at least one alternate travel service provider only includes price-dependent travel service providers.

8. The computer storage medium of claim 1, wherein transmitting the alert comprises transmitting via an RSS feed.

9. The computer storage medium of claim 1,
wherein transmitting the alert comprises transmitting HTML content including an accept button; and
wherein the approval indication is issued by the traveler by selecting the accept button.

10. The computer storage medium of claim 1, wherein the operations further comprise:
receiving, at a travel reservation system, a configuration for a third party application programming interface (API), the third party API allowing the travel reservation system to interface with a third party travel service provider, the configuration including a format used by the third party to receive reservation requests, price queries and cancellation requests;
selecting a substitute travel service provider from at least one alternate travel service provider for the at least one ancillary travel service, the at least one alternate travel service provider including the third party travel service provider; and
generating the alert, wherein the initial next action relates to the substitute travel service provider.

11. The computer storage medium of claim 10, wherein receiving the configuration for the third party application programming interface (API) includes receiving a modification to an existing third party API stored by the travel reservation system.

12. A method comprising:
receiving at a travel reservation system an electronic status change for a travel conveyance;
electronically accessing a digital travel record stored in the travel reservation system, the digital travel record comprising a reservation associated with a traveler for at least one ancillary travel service associated with the travel conveyance;
determining that a rule indicates that the at least one ancillary travel service should automatically be modified based on the electronic status change for the travel conveyance;
generating, by one or more computers, an initial next action that the rule specifies is to automatically occur with respect to the at least one ancillary travel service, based on determining that the rule indicates that the at least one ancillary travel service should automatically be modified;
electronically transmitting an alert from the travel reservation system to the traveler, the alert identifying, and inviting the traveler to, through interaction with the alert, approve, modify, or deny, the initial next action that the rule specifies is to automatically occur with respect to the at least one ancillary travel service;
receiving an approval indication indicating that the traveler approves of the initial next action;
electronically transmitting, from the travel reservation system to a remote travel service provider associated with the at least one ancillary travel service, a request to modify the at least one ancillary travel service based on the approval indication, the request identifying a current cost associated with the at least one ancillary travel service, and a threshold, set by a company providing the travel conveyance, that specifies a maximum extent to which a cost associated with the modified ancillary travel service may vary from the current cost;
receiving, by the travel reservation system from the remote travel service provider, an indication that the remote travel service provider can provide the modified ancillary travel service while satisfying the threshold; and
electronically transmitting payment information from the travel reservation system to the travel service provider for use in crediting or debiting a payment associated with the at least one modified ancillary travel service, wherein the payment information is associated with a customer that reserved the at least one ancillary travel service.

13. The method of claim 12, further comprising:
selecting a substitute travel service provider from at least one alternate travel service provider for the at least one ancillary travel service, the at least one alternate travel service provider including one or more contractually favored travel service providers that a company providing the travel conveyance has a contractual obligation to favor; and
generating the alert, wherein the initial next action relates to the substitute travel service provider.

14. The method of claim 12, further comprising:
receiving, at a travel reservation system, a configuration for a third party application programming interface (API), the third party API allowing the travel reservation system to interface with a third party travel service provider, the configuration including a format used by the third party to receive reservation requests, price queries and cancellation requests;
selecting a substitute travel service provider from at least one alternate travel service provider for the at least one ancillary travel service, the at least one alternate travel service provider including the third party travel service provider; and
generating the alert, wherein the initial next action relates to the substitute travel service provider.

15. A system comprising:
one or more computers; and
a computer-readable medium coupled to the one or more computers having instructions stored thereon which, when executed by the one or more computers, cause the one or more computers to perform operations comprising:
receiving at a travel reservation system an electronic status change for a travel conveyance;
electronically accessing a digital travel record stored in the travel reservation system, the digital travel record comprising a reservation associated with a traveler for at least one ancillary travel service associated with the travel conveyance;
determining that a rule indicates that the at least one ancillary travel service should automatically be modified based on the electronic status change for the travel conveyance;
generating an initial next action that the rule specifies is to automatically occur with respect to the at least one ancillary travel service, based on determining that the rule indicates that the at least one ancillary travel service should automatically be modified;
electronically transmitting an alert from the travel reservation system to the traveler, the alert identifying, and inviting the traveler to, through interaction with the alert, approve, modify, or deny, the initial next action that the rule specifies is to automatically occur with respect to the at least one ancillary travel service;
receiving an approval indication indicating that the traveler approves of the initial next action;
electronically transmitting, from the travel reservation system to a remote travel service provider associated with the at least one ancillary travel service, a request to modify the at least one ancillary travel service based on the approval indication, the request identifying a current cost associated with the at least one ancillary travel service, and a threshold, set by a company providing the travel conveyance, that specifies a maximum extent to which a cost associated with the modified ancillary travel service may vary from the current cost;

receiving, by the travel reservation system from the remote travel service provider, an indication that the remote travel service provider can provide the modified ancillary travel service while satisfying the threshold; and electronically transmitting payment information from the travel reservation system to the travel service provider for use in crediting or debiting a payment associated with the at least one modified ancillary travel service, wherein the payment information is associated with a customer that reserved the at least one ancillary travel service.

16. The system of claim 15, wherein the operations further comprise:

selecting a substitute travel service provider from at least one alternate travel service provider for the at least one ancillary travel service, the at least one alternate travel service provider including one or more contractually favored travel service providers that a company providing the travel conveyance has a contractual obligation to favor; and generating the alert, wherein the initial next action relates to the substitute travel service provider.

17. The system of claim 15, wherein the operations further comprise:

receiving, at a travel reservation system, a configuration for a third party application programming interface (API), the third party API allowing the travel reservation system to interface with a third party travel service provider, the configuration including a format used by the third party to receive reservation requests, price queries and cancellation requests;

selecting a substitute travel service provider from at least one alternate travel service provider for the at least one ancillary travel service, the at least one alternate travel service provider including the third party travel service provider; and generating the alert, wherein the initial next action relates to the substitute travel service provider.

* * * * *